2 Sheets—Sheet 1.
J. TIMMS.
CAR COUPLING.
No. 11,348.
Reissued June 27, 1893.
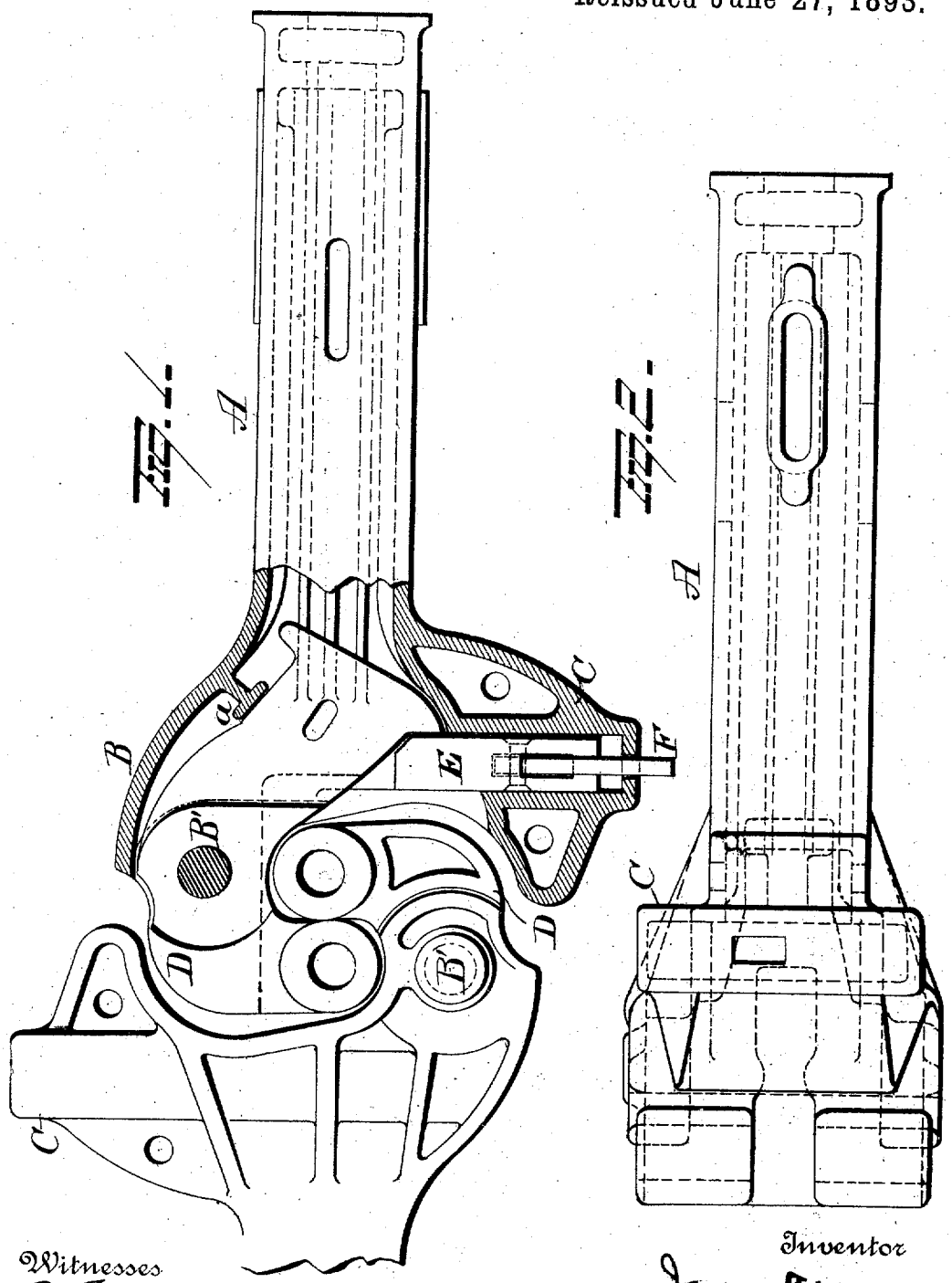
Witnesses
G. F. Timmis
V. E. Hodges.
Inventor
James Timms
By H. A. Burgess
Attorney 2 Sheets—Sheet 2.

J. TIMMS.

CAR COUPLING.

No. 11,348.

Reissued June 27, 1893.

Witnesses

E. A. Nottingham

G. F. Dennis

Inventor

James Timms.

By H. A. Simmons.

Attorney

UNITED STATES PATENT OFFICE.

JAMES TIMMS, OF COLUMBUS, OHIO, ASSIGNOR TO THE TIMMS AUTOMATIC CAR COUPLER COMPANY, OF SAME PLACE.

CAR-COUPLING.

SPECIFICATION forming part of Reissued Letters Patent No. 11,348, dated June 27, 1893.

Original No. 450,539, dated April 14, 1891. Application for reissue filed January 24, 1893. Serial No. 459,631.

*To all whom it may concern:*

Be it known that I, JAMES TIMMS, of Columbus, in the county of Franklin and State of Ohio, have invented certain new and useful Improvements in Automatic Hook Car-Couplers; and I do declare the following to be a full, clear, and exact description of the invention, such as will enable others skilled in the art to which it pertains to make and use the same.

My invention relates to improvements in automatic hook car-couplers; and it consists in certain features of construction and in combination of parts hereinafter described, and pointed out in the claims.

Figure 4:
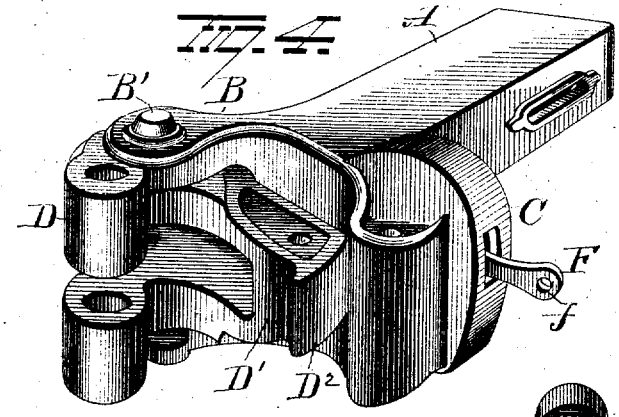
Figure 6:
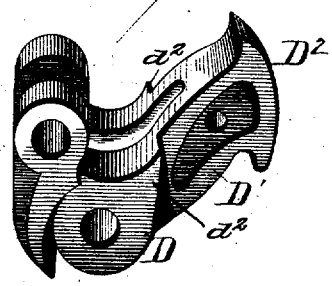
Figure 3:
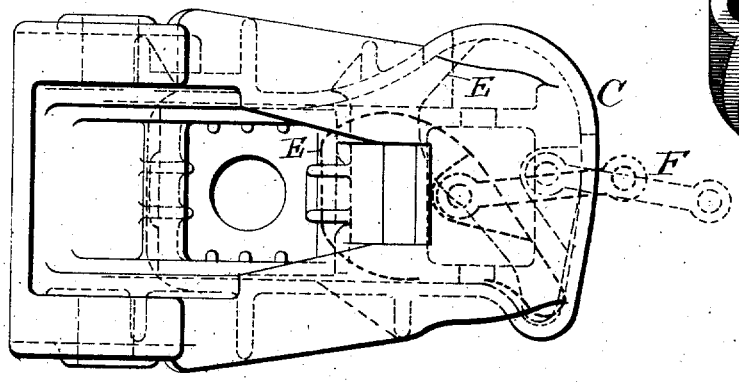
Figure 7:
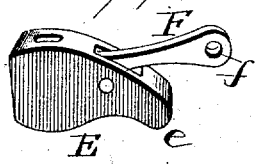
Figure 5:
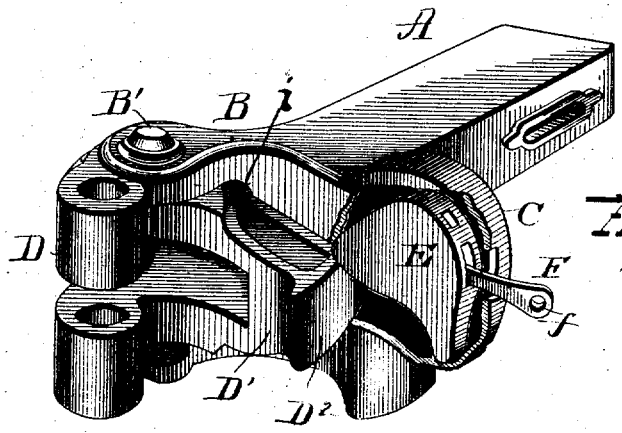

In the accompanying drawings, Figure 1 is a plan, a portion of the draw-head being broken away to show the internal construction. Fig. 2 is a side elevation. Fig. 3 is an end elevation. Fig. 4 is a view in perspective showing the coupler in position open. Fig 5 is a view in perspective, a portion of the guard-arm being broken away to show the internal construction. Fig. 6 is a view in perspective showing the knuckle detached. Fig. 7 is a view in perspective of the locking block detached.

A represents the draw-bar; B, the draw-head; C, the guard-arm of the draw-head, and D the knuckle, the latter operating in the chamber of the draw-head, to which latter the knuckle is pivotally secured by means of pin B′. The guard-arm is also chambered to accommodate the tilting gravity locking-block E, known as the "lock." the latter chamber communicating with the chamber of the draw-head, whereby the locking-arm D′ of the knuckle, known usually as the "knuckle-tongue," may swing into and out of the chamber of the guard-arm in coupling and uncoupling.

The lock E (shown more clearly in Fig. 7) has a broad end presenting toward the center of the draw-head, and from thence the lock tapers off and is curved somewhat downward, terminating in a rounded end *e*. The latter serves as a pivotal bearing for the lock, and being stepped or seated in a corresponding depression in the lower wall of the guard-arm the lock is thereby retained in position without other fastening. For tilting the lock in a vertical plane the lock is provided with link F, the latter extending out through a suitable hole in the end wall of the guard-arm, the outer end of the link having usually an eye *f*, that may serve as a handle, or may serve in attaching other links, rods, chains, cables (not shown) that may lead, for instance, to the side of the car, or through the medium, for instance, of suitable bell-crank lever or levers may lead to the top of the car, or to any point where it may be desired. The locking arm or tongue D′ has a head $D^2$, elongated laterally—that is to say, elongated in the direction of its throw, and to such an extent that this head is never withdrawn from under the lock in opening the knuckle, as in uncoupling. When the knuckle is closed, as in coupling, the lock falls by gravity in front of the tongue or the head thereof, and in all other operative positions of the knuckle the lock simply rides on head $D^2$, and the slight friction thus caused is about all the resistance encountered in closing the knuckle that is to say, in coupling the cars. As a child can easily close the knuckle, it follows that cars for coupling purposes need not be brought together with violence, and if the cars approach each other so closely that the knuckle is closed by contact with the knuckle of an opposing draw-bar the locking of the knuckle will thereby accrue with certainty. The lock when depressed overlaps the knuckle-tongue and head so far as to furnish ample wearing surface, and the locking accrues so far from the fulcrum of the knuckle that any wearing of these parts will not materially affect the closed or locked position of the knuckle. In the closed position of the knuckle its faces or shoulders $d^2$ abut against corresponding faces or shoulders *i*, on the draw head or casing and thereby constitutes the primary stop for the knuckle. These bearing faces or shoulders being arranged parallel or substantially parallel to the buffing face of the knuckle and extending on opposite sides of the pivotal bearing B′, afford extended transverse bearings at right angles to the direction of the buffing strains or blows thereby causing such strains or blows to be transmitted squarely against the draw-head; but if the knuckle be closed with great violence, and such an occurrence, more especially in coupling freight cars, is likely to be the rule rather than the exception, the wall of the guard-arm or casing might and probably would be broken unless the parts were constructed heavier than is desirable. To remedy this difficulty I provide a second stop already mentioned, the secondary stop being located and constructed as shown, to wit: stop *a* is usually cast integral with the draw-head, and is preferably of the T-shaped variety shown, so that the head thereof will present a broad surface to engage the opposing tongue of the knuckle. Besides the advantage of thus distributing the force of the blow to different parts of the casing, other advantages accrue, to wit: with two stops located some distance apart less lateral strain is had on pin B′. With the construction shown it is evident that any pulling strain on the couplers tends to make the opposing knuckles hug each other more closely, and any slack that may accrue at the lock or at the fulcrum of the knuckle does not tend to crowd the knuckle laterally or toward the guard-arm, and hence there is no tendency in such cases for the knuckle to bind on the guard-arm, as would be the case if the lock were located along the draft-line, in which latter case the tendency of the knuckle would be to crowd toward the guard-arm.

It will be observed that the locking device is entirely closed from the weather, so that snow or ice cannot interfere with its operation. By reason of the strength of the parts and the simple character of the lock it would seem impossible for the lock to be broken, disarranged, or become inoperative from any cause.

What I claim is—

1. A car-coupler of the class indicated, comprising in the main draw-bar, head, and guard-arm, a knuckle, and a co-operating tilting gravity-lock pivotally supported on its lower end, the latter being located in the chamber of the guard-arm in position to ride on the opposing member of the knuckle in shifting the latter and in position for falling in front of such member when the knuckle is in position closed, substantially as set forth.

2. A car-coupler of the class indicated and having a knuckle provided with a tongue, such tongue having a head elongated in the direction of its throw, of a tilting gravity-lock pivotally supported on its lower extremity and located in the chamber of the guard-arm in position to ride on such head when the knuckle is unlocked and in position for falling in front of such head, and thereby locking the knuckle in its closed position, substantially as set forth.

3. In a car-coupler the combination with a pivoted knuckle having straight shoulder-bearings on its upper and lower side which extend inwardly to a point practically in line with the line of impact of the opposing knuckle, and corresponding straight shoulder-bearings on the draw-head—said shoulders forming the primary stop of the knuckle, substantially as set forth.

4. In a car-coupler, the combination with a draw-head, of a pivoted knuckle having shoulder bearings arranged parallel or practically parallel with the buffing face of the knuckle, said bearing being constructed to directly engage corresponding bearings on the draw-head, substantially as set forth.

5. In a car coupler the combination with a pivoted knuckle having bearing faces or shoulders formed parallel or substantially parallel with the buffing face of the knuckle and extending laterally on each side of the knuckle pivot, of a draw-head or casing constructed with corresponding straight bearings or faces with which said bearing faces or shoulders on the knuckle, engage, substantially as set forth.

In testimony whereof I sign this specification, in the presence of two witnesses, this 9th day of December, 1892.

JAMES TIMMS. [L. S.]

Witnesses:
E. P. SNIVELY,
H. G. AFFLECK.